United States Patent [19]
Wilson

[11] Patent Number: 5,293,518
[45] Date of Patent: Mar. 8, 1994

[54] MULTIPLE TWO-NODE WINDINGS ELECTRICAL MOTORS CONTROLLERS

[76] Inventor: John T. R. Wilson, 736 Lynnhaven La., La Canada Flintridge, Calif. 91011

[21] Appl. No.: 746,602

[22] Filed: Aug. 19, 1991

Related U.S. Application Data

[63] Continuation-in-part of Ser. No. 804,588, Mar. 20, 1986, Pat. No. 5,077,509, which is a continuation-in-part of Ser. No. 188,000, Sep. 17, 1980, abandoned.

[51] Int. Cl.$^5$ .............................................. H01R 39/46
[52] U.S. Cl. ...................................... 318/439; 318/292; 318/542; 318/245
[58] Field of Search ............... 318/139, 244, 245, 246, 318/439, 256, 257, 288, 290, 291, 292, 293, 538, 539, 541, 542, 287; 310/184, 185, 209, 229

[56] References Cited

U.S. PATENT DOCUMENTS

| | | | |
|---|---|---|---|
| 655,563 | 8/1900 | Lindstrom . | |
| 727,684 | 5/1903 | Potter . | |
| 971,199 | 9/1910 | Janisch . | |
| 3,569,809 | 3/1971 | Corner . | |
| 3,577,049 | 5/1971 | Madurski | 318/138 |
| 3,621,929 | 11/1971 | Oberthur | 318/139 X |
| 3,858,098 | 12/1974 | Htsui | 318/138 |
| 4,305,027 | 12/1981 | Wilson | 318/439 |
| 4,351,405 | 9/1982 | Fields et al. | 318/139 |
| 4,459,503 | 7/1984 | Kropp et al. | 310/198 |
| 4,580,081 | 4/1986 | Krueger et al. | 318/139 |

Primary Examiner—Bentsu Ro
Attorney, Agent, or Firm—Nilsson, Wurst & Green

[57] ABSTRACT

The invention discloses a controller for controlling an electric motor having a stator and an armature, the stator includes stator magnetic poles, the armature includes multiple two-node, open circuit armature windings. The armature windings are inductively linked the armature and insulated from the armature and from each other. The motor has at least one repeatable section, each repeatable section includes a group of poles and windings. The stator has two stator magnetic poles per repeatable section. The controller comprises magnetomotive force means for energizing the stator magnetic poles as a north pole and a south pole per repeatable section with adjacent poles being of opposite polarity, means to control electrical currents in from none to at least one two-node, open circuit armature winding thereby forming armature electromagnetic poles of various numbers to the strength levels available, with adjacent armature electromagnetic poles having opposite polarity, and with no more than two armature electromagnetic poles per repeatable section, to control the force and torque generated by the motor.

19 Claims, 5 Drawing Sheets

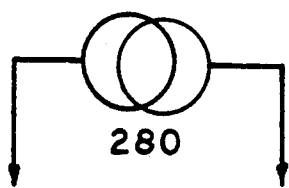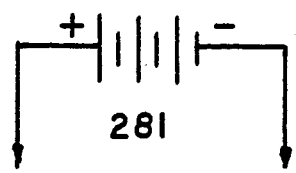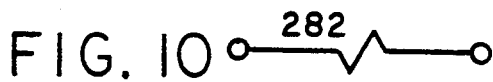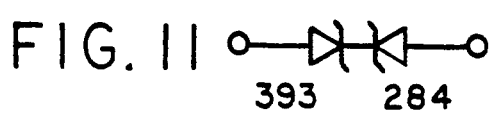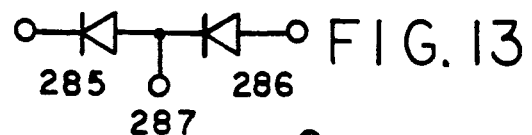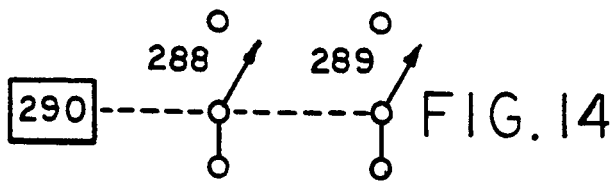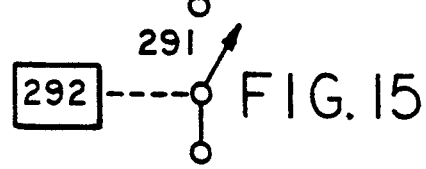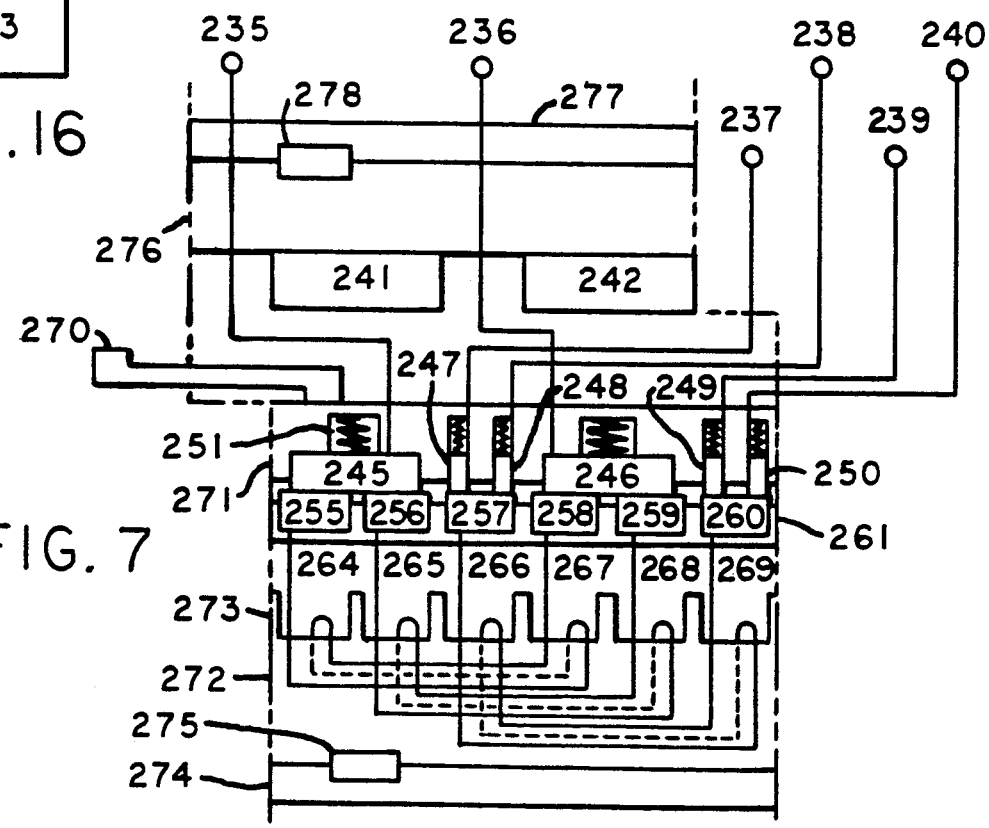

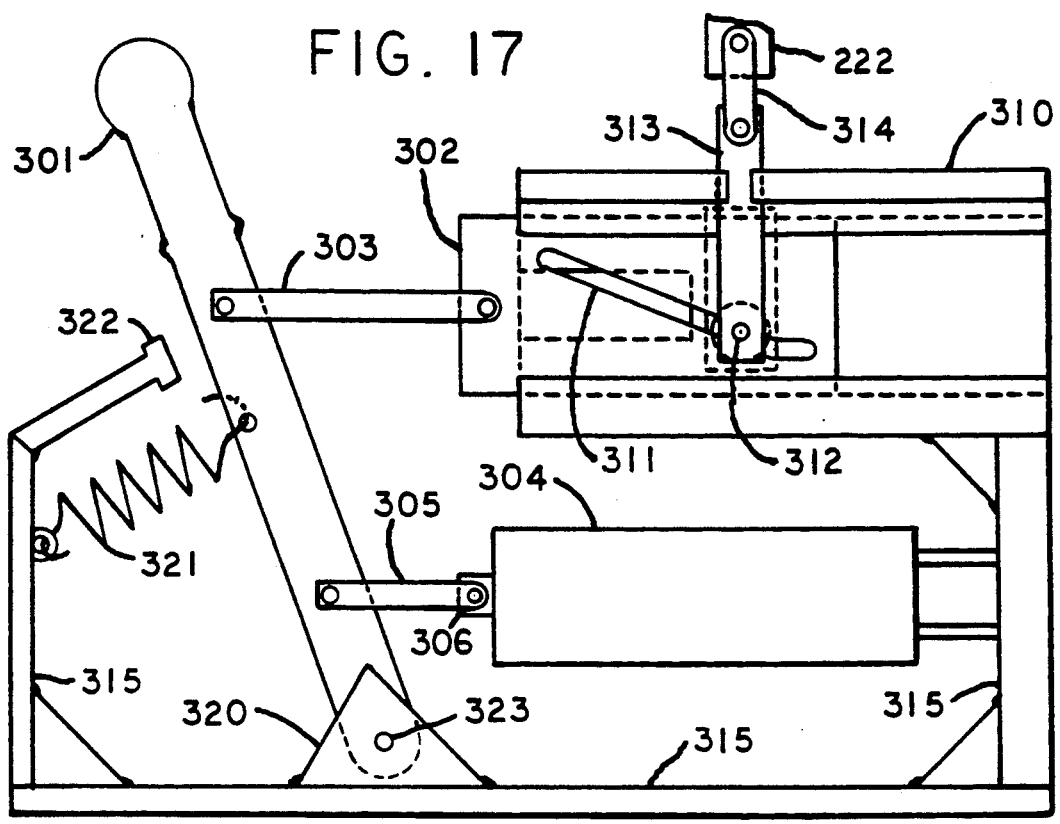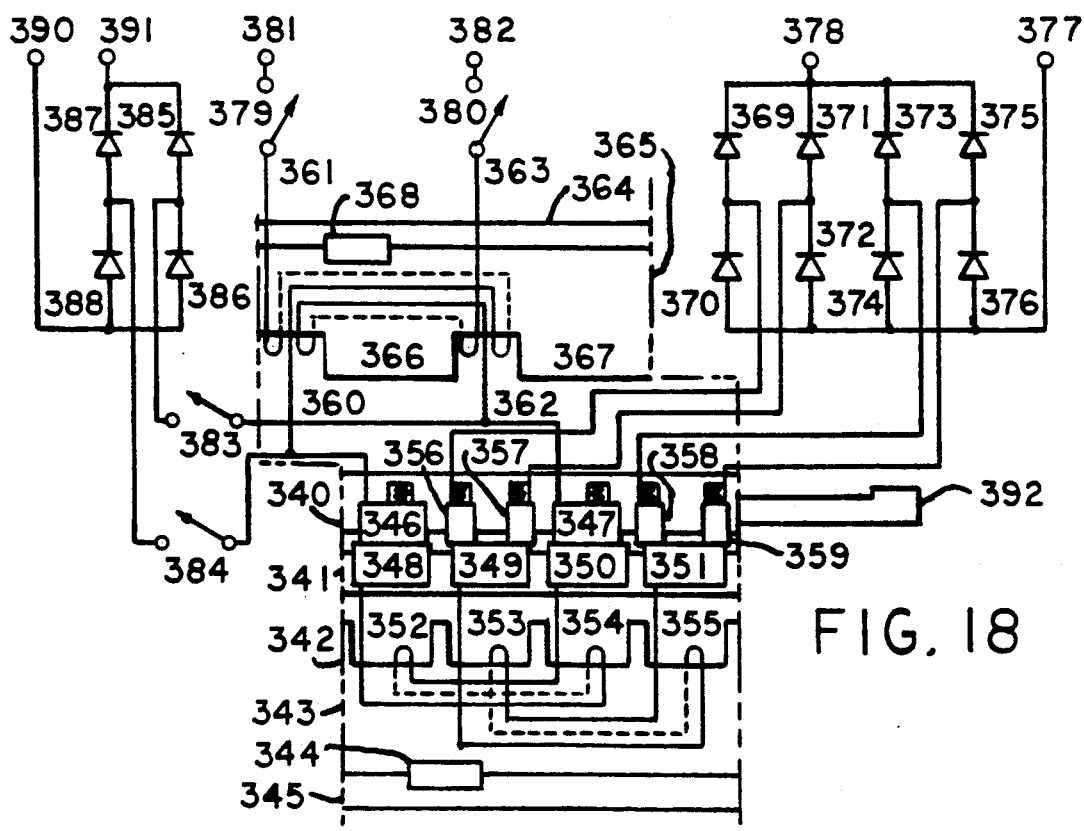

MULTIPLE TWO-NODE WINDINGS ELECTRICAL MOTORS CONTROLLERS

This application is a continuation-in-part of Ser. No. 06/804,588, filed Mar. 20, 1986, now U.S. Pat. No. 5,077,509, which is a continuation-in-part of Ser. No. 06/188,000, filed Sep. 17, 1980, now abandoned.

SUMMARY OF THE INVENTION

This invention is of controllers for multiple windings electrical motors and two-node armature winding electrical motors such as are described in U.S. Pat. No. 4,305,027 and U.S. Pat. No. Re. 32,674 which is the reissue of U.S. Pat. No. 4,305,027; these patents are incorporated herein by this reference.

The present invention provides for force or torque control of a linear or rotary, multiple windings electrical motor or a two-node armature winding electrical motor by operating various numbers of electrical switches which energize various numbers of force or torque generating winding sets within the motor and by positioning a brush holder. The means of energizing and de-energizing these winding sets are individual electrical switches, which can be sequentially operated to preserve the advantages of a multiple windings electrical motor at all force or torque levels. The multiple windings electrical motor is uniquely controllable; the multiple windings electrical motor has multiple brushes in two groups contacting the commutator which provide multiple electrical control points. Each of these brushes can be energized, either directly or in series with a stator winding or portion thereof, through an electrical switch with electrical energy derived from an electrical energy source. Thus, by operating these electrical switches the magnitude of force or torque generated by the multiple windings electrical motor can be controlled. Another aspect of the multiple windings electrical motor force or torque control is use of the position of the brush holder to control the positions of the groups of brushes and thereby control the direction and magnitude of force or torque generation. This invention includes the sequential operation of individual electrical switches to proceed in increments to any desired force or torque generation within the capability of the motor.

This invention includes means for recovering electromagnetic energy from multiple windings electrical motor open circuit armature windings when interrupted while contacted through coupled commutator segments by brushes of the two groups. This energy recovery means includes, for one group brush, a half bridge circuit composed of a plurality of diodes coupled between the group brush and positive and negative polarity terminals of a DC electrical energy coupling means, and two or more group brushes are so connected. The diodes are arranged to be back-biased until an open circuit armature winding is interrupted as above and thereby induces voltage which forward-biases certain diodes of the half bridge circuits coupled to commutator segments coupled to the ends of the interrupted open circuit armature winding, and thereby electromagnetic energy associated with the interrupted open circuit armature winding is recovered as electrical energy and delivered with respective polarity to the electrical terminals.

BACKGROUND OF THE INVENTION

1. Field of the Invention

This application is related to motor speed and torque controllers for both positive and negative torques, and to motor starters, and power output controllers. This invention relates to such controllers for brush-type and brushless machines, and more particularly, to controllers for brush-type and brushless electrical machines of the type disclosed in the referenced patents titled: Multiple Windings Electrical Machines.

2. Background Art

Previous brush-type electrical machine controllers have used series resistance to control speed and torque and current, especially the excessive currents caused during the starting of series motors. The control of these brush-type machines is very important in considering the application of these motors. There has been a lack of a reliably-operating, efficient controller for brush-type machines. The speed and torque of a series motor energized from a constant potential supply can be controlled by inserting resistance in series with the supply line. Speed control for shunt and compound motors can be obtained by inserting resistance in series with the armature circuit only. The stator field flux of shunt motors can be varied to control the speed of these motors, although special care is required to prevent overspeeding of the motor if the shunt stator field flux becomes very weak. The speed of DC motors can be varied by varying the voltage applied to the motors; the Ward Leonard system of speed control is an example of varying the voltage applied to the DC motor. In the Ward Leonard system the adjustable output voltage from a motor-generator set is applied to the motor. Electric vehicle motor controllers use semiconductor chopper controllers as well as electromechanical switches to connect resistors and batteries in various combinations to regulate electrical power input to the motor, which thereby control the motor output torque.

Torque or force generated by a rotary or linear motor, respectively, are each a cause for, tend to cause, relative movement of the respective motor stator with respect to the respective motor armature. Torque is a cause for relative movement between armature and stator in a rotary motor, and force is a cause for relative movement between armature and stator in a linear motor.

3. Multiple Windings Electrical Motor

The motor comprises a stator and an armature, which are constrained with respect to each other by bearings means to bidirectional relative movement along, or rotating about only one axis. The stator comprises a stator magnetic yoke, stator magnetic poles, structural support means, a key means interlocking the stator magnetic yoke and the structural support means, magnetomotive force means, a brush holder means, brushes, and electrical energy coupling means. The stator magnetomotive force means are either stator windings with current flowing through them, or permanent magnets. The brush holder means positions the brushes and spring-loads them against the commutator and insulates the brushes from each other. The armature comprises a magnetic armature with teeth regularly spaced at the armature winding pitch, a commutator with conducting commutator segments, multiple two-node, open circuit armature windings per repeatable section attached to and electrically insulated from the magnetic armature and each other and with active edges of each winding spaced one stator pole pitch apart in the direction of relative movement, a mechanical energy coupling means, and a key means interlocking the magnetic armature and the mechanical energy coupling means. The armature and stator are constrained with respect to each other by bearing means which are mounted between the stator structural support means and the armature mechanical energy coupling means, so that there is an air gap separating the armature from the stator, and particularly separating the magnetic armature and the stator magnetic poles.

The armature and stator are preferred to have roughly equivalent magnetic energy, which is the magnetomotive force times the flux density times the volume, to more effectively interact with each other. The number of multiple armature windings is chosen for smoothness of operation, practicality, controllability, and convenience. It is recognized that an electrical motor of this type could be configured to have more armature windings than stator windings or that there could be no stator windings, as in a permanent-magnet field motor. The commutator has uniformly sized and spaced conducting, commutator segments which are insulated from the armature mounting and each other. It is preferred that one end of each armature winding be electrically connected to one and only one commutator segment; however, it is recognized that there could be additional commutator segments not connected to any armature winding, and that there could be more than one commutator segment electrically connected to one armature winding end. It is preferred that the number of commutator segments be equal to the number of armature winding ends, and that also equals the number of armature teeth or winding slots or winding positions; it is also preferred that the armature winding ends be connected electrically to the closest commutator segment.

A multiple windings electrical motor may be constructed of any practical number of stator pole pairs, which are also called repeatable sections; double-dashed lines in certain of the FIGS. 1 through 18, mark the boundaries of one repeatable section of the motors shown. Repeatable sections are interconnected at the stator magnetic yoke, the stator structural support means, the brush holder means, the armature mechanical energy coupling means, the magnetic armature, the commutator, and at the electrical energy coupling means.

In operation, the multiple windings electrical motor utilizes external energy to establish a magnetic field and magnetic flux which links the stator magnetic yoke, stator magnetic poles, magnetic armature, air gap, armature windings, and stator windings, when they are present. The external energy for the motor is supplied by an electrical energy source such as a unidirectional voltage source; the electrical energy source may be an alternating current source when the electrical motor is a universal type; some of the external energy may be supplied by one or more permanent magnets when such permanent magnets are used to establish the stator magnetomotive force.

The multiple windings electrical motor includes brush vacancies—two brush vacancies per repeatable section. These vacancies are used to avoid shorting between positive and negative voltages, or AC voltages, by a brush bridging two commutator segments, and to interrupt the armature current and initiate the energy disposal from an armature winding-to-be-commutated. The brush vacancies divide the brushes into two groups called first brush group means and second brush group means.

Stator windings with current flow or permanent magnets magnetically energize the stator magnetic poles. Armature windings with current flow establish armature electromagnetic poles. These stator magnetic poles and armature electromagnetic poles are positioned with respect to each other so that the total magnetic field energy of the motor will incrementally increase when the energized armature windings move incrementally with respect to the stator; this is the method of force or torque generation by both linear and rotary motors. The magnitude of the force or torque generated is proportional to the change in the motor magnetic field energy per unit relative movement. The commutation of the armature windings is designed to maintain the force or torque generating actions of the stator and armature described above, by continuously re-establishing these positional relationships, approximately, in spite of relative movement.

The energy in the interrupted armature winding can be disposed of by dissipating it or by recovering it for re-use. To dissipate the interrupted armature windings energy external to the multiple windings electrical motor, add electrical connections from the group brushes to externally located dissipating devices through half bridge circuits; the diodes of the half bridge circuits are connected to be normally back-biased and only forward-biased when the energy dissipation is being done. The various types of energy dissipating devices considered are: resistors, back-to-back zener diodes, back-to-back selenium clipper diodes and varistors. The recovery of energy from interrupted armature windings is believed to be a new concept, and one which will improve the efficiency of electrical machines.

DISCLOSURE OF THE INVENTION

This invention controls the positive and negative force to torque generated respectively by a linear or rotary electric motor. This is positively done by simultaneously energizing various numbers of motor open circuit armature windings, thereby establishing various numbers of armature electromagnetic poles of the strength levels available. The stator magnetic poles are energized by permanent magnets or electromagnetically to various numbers of poles and to the strength levels available using one or more stator windings. The motor force or torque generated is controlled by varying the cumulative strengths of magnetic interaction between the armature electromagnetic poles and the stator magnetic poles, which is controlled by varying the armature pole strengths and the stator pole strengths to the degree possible in particular configurations. These controllers also control adjustment of the armature electromagnetic pole positions with respect to the stator magnetic poles for maximum effectiveness and efficiency at one or more control steps. These controllers also recover electromagnetic energy from interrupted and un-energized armature windings as electrical energy and make this energy available for re-directed usage, such as negative force or torque generation. These controllers energize only the portions of the motor needed to generate the desired force or torque. These controllers have very low power dissipation because the control elements are on-off switches, which are designed to have low power dissipation in both the "on" and "off" states. In most configurations, the maximum motor armature current is carried through several parallel windings and control elements, thus reducing the current requirements of the control elements compared to using a single control element. These controllers can control motors with either stators stationary and armatures movable or armatures stationary and stators movable and brushless motors. These motors and controllers can be configured as brushless by having movable permanent magnet stators and stationary armatures which use appropriate commutation means.

Each motor repeatable section has at least one force or torque generating winding set, which comprises an open circuit armature winding and a stator magnetomotive force means, which may be generated by a stator winding with current flow or a permanent magnet. Magnetomotive force is the force by which a magnetic field is produced, either by a current flowing through a coil of wire, or by the proximity of a magnetized body. Each force or torque generating winding set is energized by electrical current flow through a force or torque generating set current control means. This control means may include any of a variety of electrical switches or may include a means to control the commutating contact of individual brushes of the first and second groups of brushes, associated with individual force or torque generating winding sets by lifting brushes from the commutator.

In multiple-repeatable-section multiple windings electrical motors, it is possible to obtain more increments of force or torque control than the number of two-node, open circuit armature windings. If one two-node, open circuit armature winding at a time were connected across the electrical power source, this would make the number of force or torque control increments equal to the number of such armature windings. More force or torque control increments than the number of two-node, open circuit armature windings is possible, in such a motor, because each such armature winding is connected across the electrical power source through associated commutator segments and one of two alternately-described brush groups. The first alternately-described connection is to a first brush group and a second brush group in one repeatable section. The second alternately-described connection is to a first brush group in one repeatable section and a second brush group in an adjacent repeatable section. So, force or torque control increments may be obtained by placing switches in series in each of the alternately-described connections. The alternation is controlled by commutator action which is by relative movement between the motor stator and the motor armature.

BRIEF DESCRIPTION OF THE DRAWINGS

In FIG. 1 dotted lines are used to represent stator or armature windings as they pass behind stator or armature magnetic members respectively.

In FIG. 6, dotted lines are used to represent stator or armature windings as they pass behind stator or armature magnetic members respectively.

FIG. 7 shows a linear representation of a repeatable section of a multiple windings electrical motor with a positioning lever on the brush holder to control the brush holder position. The FIG. 7 motor repeatable section features include three, two-node, open circuit armature windings, two group brushes, permanent magnets to energize the stator poles, and brush vacancy brushes with electrical connections available.

FIG. 8 shows an alternating current electrical energy source for causing current flow in armature windings, and stator windings when they are present.

FIG. 9 shows a battery for causing current flow in armature windings, and stator windings when they are present.

FIG. 10 shows a resistor typical of those which can be connected for energy disposal.

FIG. 11 shows two zener diodes connected back-to-back for energy disposal. Single zener diodes may also be used for energy disposal.

FIG. 12 shows a varistor which can be connected for energy disposal.

FIG. 13 shows a half bridge circuit, which is composed of two diodes and can be connected for energy recovery and disposal.

FIG. 14 shows a two-pole switch which can be connected to control current flow of a multiple windings electrical motor.

FIG. 15 shows a single-pole switch which can be connected to control current flow in a multiple windings electrical motor, and which also can be operated with the two-pole switch of FIG. 14 to make a three-pole switch which can be connected to control current flow in a multiple windings electrical motor.

FIG. 16 shows a general cooperative control for a multiple windings electrical motor which combines two or more means to control the force or torque generated by the motor.

FIG. 17 shows a particular cooperative controller for the multiple windings electrical motor of FIG. 6 in which the current control switches are operated in conjunction with the positioning of the brush holder.

FIG. 18 shows a controller for a linear representation of a repeatable section of a multiple windings electrical motor with a positioning lever on the brush holder and two current control switches. The motor has two, two-node, open circuit armature windings, two group brushes, and a single, split stator winding. Shown also in FIG. 18 is controllable energy recovery and disposal from the two group brushes to cause dynamic braking; the control shown is by switches although the same can be achieved by lifting group brushes from the commutator contact.

DETAILED DESCRIPTION OF THE INVENTION

This detailed description will explain: (1) the forward torque controller for a two-stator-pole multiple windings electrical motor, (2) the recovery of energy from armature windings not energized as a force or torque generating set, (3) the reverse torque controller for a two-stator-pole multiple windings electrical motor, (4) the forward torque controller for the general, multiple-stator-pole-pair multiple windings electrical motor as represented by a two-stator-pole-pair multiple windings electrical motor, (5) the reverse torque controller for the general multiple windings electrical motor, (6) the control of a single-repeatable-section multiple windings electrical motor using brush holder positioning and an assortment of control elements, (7) the cooperative control of current control switches and brush holder position, and (8) the control of a single-repeatable-section multiple windings electrical motor using brush holder position, current control switches, and switches to control group brush energy recovery and disposal.

Figure 1:
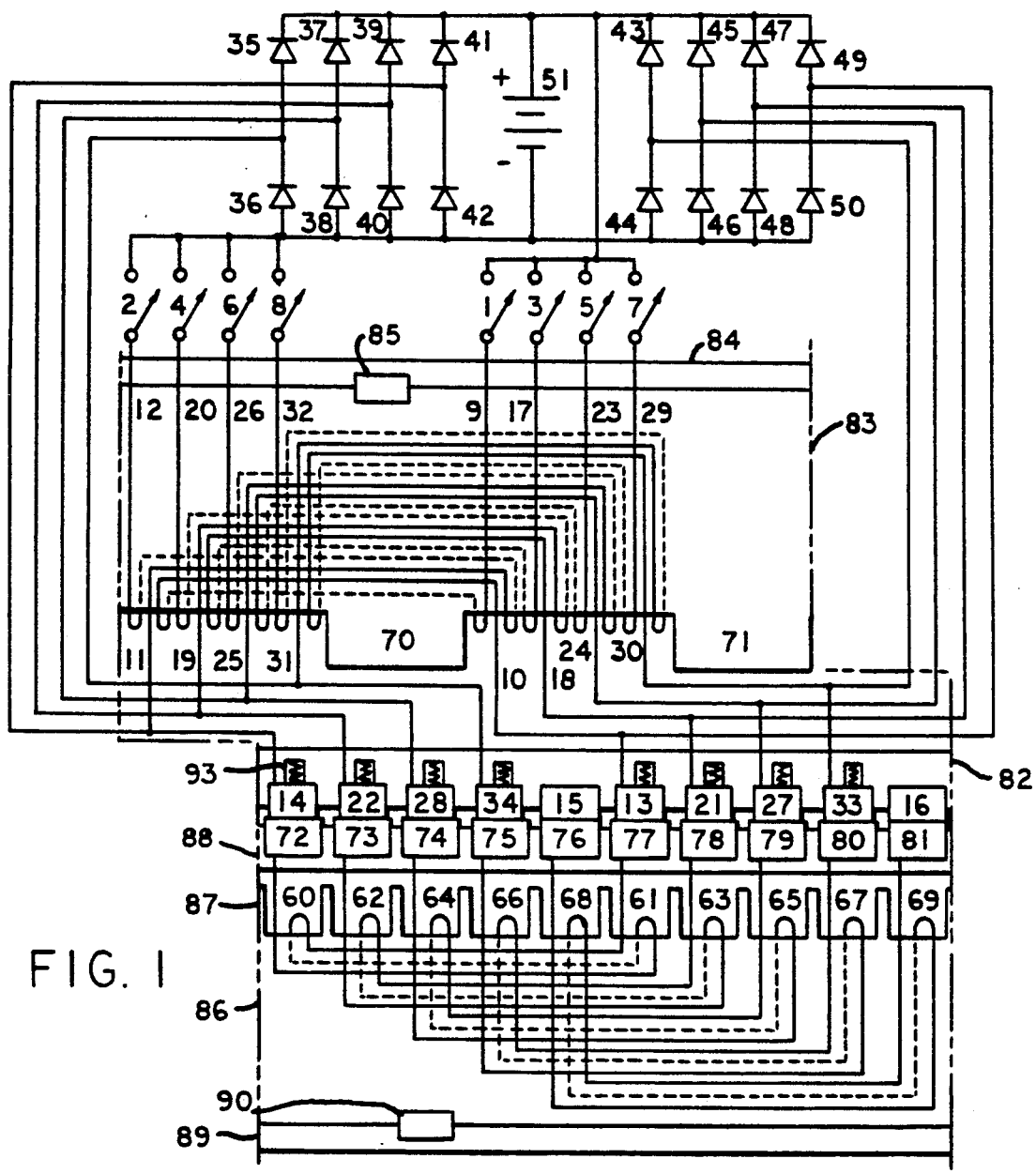
FIG. 1 shown a linear representation of a two-pole multiple windings electrical motor controller in which the multiple windings electrical motor has four force or torque generating winding sets and the force or torque may be varied between zero and maximum in four discrete steps by operating four, two-pole, single throw switches. The multiple windings electrical motor linear representation uses the same drawing simplifications used in the reference patent and adds a brush holder. To simplify FIG. 1 and represent the multiple windings electrical motor in one view, the commutator 88 with commutator segments 72 through 81 and brushes 14, 22, 28, 34, 15, 13, 21, 27, 33, and 16 and connecting circuits and brush holder 82 and brush springs, one designated 93, are shown in an enlarged air gap between the stator magnetic poles 70 and 71 and the magnetic armature 86. The preferred and practical electrical machine construction in accordance with the reference patent and the present application is to remove these elements from this fictitious but simplifying air gap placement and place them adjacent to stator magnetic yoke 83 and armature magnetic member 86. Several figures showing the practical placement of the commutator and brush holder with brushes in a rotary multiple windings electrical machine are shown in the reference patent.

Consider a two-pole multiple windings electrical motor as represented in linear fashion in FIG. 1 having two stator magnetic poles 70 and 71 with four split stator windings: 9-10 and 11-12, 17-18 and 19-20, 23-24 and 25-26, and 29-30 and 31-32, and five, two-node, open circuit armature windings: 60-61, 62-63, 64-65, 66-67, and 68-69. It will be recognized from the reference patent that four stator windings is a number of stator windings chosen for the simplicity of presenting this multiple windings electrical motor controller and does not imply any multiple windings electrical motor or controller limitation at more or less than four stator windings; similarly, the five, two-node, open circuit armature windings are chosen for the simplicity of presenting this multiple windings electrical motor controller and does not imply any multiple windings electrical motor or controller limitation at more or less than five, two-node, open circuit armature windings. FIG. 1 also shows: stator magnetic yoke 83, structural support 84, key 85, brush spring 93, spring-loaded brushes 13, 14, 21, 22, 27, 28, 33, 34, brush holder 82, magnetic armature 86 with teeth one of which is 87, commutator 88 with conducting segments 72 through 81, mechanical energy coupling 89, key 90, and brush vacancies 15 and 16. In a rotary multiple windings electrical motor the structural support 84 is the stator housing and the mechanical energy coupling 89 is the shaft, and bearing position the shaft in the housing and allow the shaft to rotate within the housing; this construction is shown in the reference application. A brush vacancy is also defined in the reference application, but in general terms, a brush vacancy is a gap in the brushes which allows the interruption and reversal of the two-node, open circuit armature windings currents. The brushes are divided at brush vacancies into two groups: first brushes group brushes and second brushes group brushes. The brushes 13, 21, 27, and 33 are of the first group, and brushes 14, 22, 28, and 34 are of the second group. The brush holder 82 is mechanically attached to the structural support 84, and the commutator 88 is mechanically attached to the mechanical energy coupling 89. Such a multiple windings electrical motor can be varied in torque increments of approximately one-fourth of the maximum torque capability by energizing or de-energizing the split stator windings one set at a time in a four-step sequence.

In FIG. 1, the first step of this sequence is to energize the stator windings 9-10 and 11-12 from unidirectional voltage source 51 by closing electrical switches 1 and 2. The stator windings 9-10 and 11-12 connect to first and second brushes group brushes 13 and 14 respectively, which connect through various segments of the commutator 88 at various armature positions to energize two-node, open circuit armature windings once removed contrary to the direction of torque generation from the brush vacancies 15 and 16, and from which the armature and two-node, open circuit armature windings will move toward the brush vacancies in the forward direction of torque generation—armature movement to the left in FIG. 1.

In FIG. 1, the second step of this sequence is to continue the first step and additionally energize the stator windings 17-18 and 19-20 from the source 51 by closing electrical switches 3 and 4. The stator windings 17-18 and 19-20 connect to first and second brushes group brushes 21 and 22 respectively, which connect through various segments of the commutator 88 at various armature positions to energize two-node, open circuit armature windings twice removed from the brush vacancies contrary to the direction of torque generation.

In FIG. 1, the third step of this sequence is to continue the second step and additionally energize the stator windings 23-24 and 25-26 from the source 51 by closing electrical switches 5 and 6. The stator windings 23-24 and 25-26 connect to first and second brushes group brushes 27 and 28 respectively, which connect through various segments of the commutator 88 at various armature positions to energize two-node, open circuit armature windings thrice removed from the brush vacancies contrary to the direction of torque generation.

In FIG. 1, the fourth step of this sequence is to continue the third step and additionally energize the stator windings 29-30 and 31-32 from the source 51 by closing electrical switches 7 and 8. The stator windings 29-30 and 31-32 connect to first and second brushes group brushes 33 and 34 respectively, which connect through various segments of the commutator 88 at various armature positions to energize two-node, open circuit armature windings fourth removed from the brush vacancies contrary to the direction of torque generation.

Notice that these four steps energize first and second brushes group brushes at positions in a sequence with respect to the brush vacancies, which is a sequence directed contrary to the torque-generation direction. The first step energizes the first and second brushes group brushes in the positions once removed from the brush vacancies; the second step continues the first step and energizes the first and second brushes group brushes in the positions twice removed from the brush vacancies; the third step continues the second step and energizes the first and second brushes group brushes in the positions thrice removed from the brush vacancies; and, the fourth step continues the third step and energizes the first and second brushes group brushes in the positions fourth removed from the brush vacancies. At each step of this energizing sequence of the stator windings and these open-circuit-armature-windings-energizing first and second brushes group brushes positions, the previously energized steps are retained as a new step is energized. Thus, the multiple windings electrical motor configuration is retained at each energized step.

The de-energization sequence is the reverse of the energizing sequence. Thus, from the condition of having all four two-node- open-circuit-armature-windings-energizing first and second brushes group brushes positions energized, the electrical switches 7 and 8 are opened to reduce to the condition of having only three two-node- open-circuit-armature windings-energizing first and second brushes group brushes positions energized; from the condition of having three two-node-open-circuit-armature-windings-energizing first and second brushes group brushes positions energized, the electrical switches 5 and 6 are opened to reduce to the condition of having only two two-node- open-circuit-armature-windings-energizing first and second brushes group brushes positons energized; from the condition of having two two-node- open-circuit-armature-windings-energizing first and second brushes group brushes positions energized, the electrical switches 3 and 4 are opened to reduce to the condition of having only one two-node- open-circuit-armature-windings-energizing first and second brushes group brushes position energized; and, to completely de-energize the multiple windings electrical motor, the electrical switches 1 and 2 are opened.

The recovery of electromagnetic energy from current interruption in two-node, open circuit armature windings while they are yet removed from the brush vacancies is done by diodes connected from each of brushes 13, 14, 21, 22, 27, 28, 33, and 34 to the positive and the negative terminals of the unidirectional voltage source 51. These diodes are designated 35 through 50 in FIG. 1. Each diode connected to the unidirectional voltage source 51 positive terminal is connected to that terminal by its cathode and its anode is connected to the brush. Each diode connected to the uni-directional voltage source 51 negative terminal is connected to that terminal by its anode and its cathode is connected to the brush. A diode pair such as 35 and 36 is called a half bridge circuit. This recovery of electromagnetic energy takes place as follows under the following conditions. Assume the multiple windings electrical motor of FIG. 1 is operating at the step-two torque level with two torque generating sets energized as described above; this will occur when electrical switches 1, 2, 3, and 4 are closed. When the armature 87 with attached commutator 88 moves to the left from the FIG. 1-shown position by one-half the commutator segments pitch, all the brushes 13, 14, 21, 22, 27, 28, 33, and 34 will straddle a gap between some of the commutator segments 72 through 81 and all the two-node, open circuit armature windings will more-or-less share in-parallel the energizing current flowing through the stator windings energized by the electrical switches 1, 2, 3, and 4. When the armature moves farther in the same direction, the parallel energizing current in the two-node, open circuit armature windings in the two un-energized two-node-open-circuit-armature-windings-energizing first and second brushes group brushes positions thrice and fourth removed from the brush vacancies, will be interrupted by the commutator and commutator segments moving so the brushes no longer straddle the gaps between the commutator segments; this current interruption will induce a large inductive kick voltage in the two-node, open circuit armature windings at the two un-energized two-node-open-circuit-armature-windings-energizing first and second brushes group brushes positions connected to brushes 27, 28, 33, and 34, which voltage is of opposite polarity to the voltage which caused the two-node-open-circuits-armature-windings currents to flow; this opposite polarity voltage is conducted to the connected commutator segments and to the brushes 27, 28, 33, and 34 riding on these segments; through the diodes connected between these brushes and the unidirectional voltage source terminals, the electromagnetic energy is recovered as electrical energy for re-use, dissipation or storage in a manner similar to that described in the referenced application. This same method of electromagnetic energy recovery from un-energized two-node, open circuit armature windings at energizing first and second brushes group brushes positions applies to a multiple windings electrical motor with any number of stator pole pairs.

Figure 3:
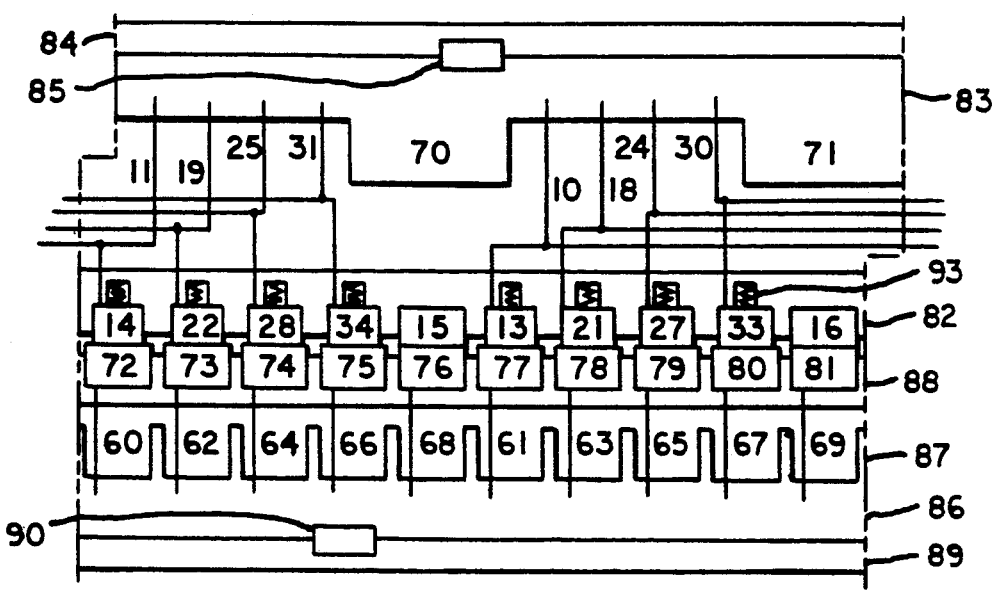
FIG. 3 is a representation of a portion of the multiple windings electrical motor of FIG. 1 showing the brush holder shifted with respect to the stator poles to a neutral position in which the multiple windings electrical motor favors zero speed, and the multiple windings electrical motor does not generate either forward or reverse force or torque.

If the foregoing is defined as controlling forward torque, then the control of reverse torque generation can be achieved by shifting the brush holder 82 of FIG. 1 by one stator pole pitch and operating the electrical switches in an inverted sequence. The reverse torque generation conditions are established by shifting the brush holder 82 to the position shown in FIG. 3 and then to the position shown in FIG. 4. To make the shift from the FIG. 1 to the FIG. 4 positions, the brush holder 82 has bearings between it and structural support 84; the bearings are not shown in the FIG. 1, FIG. 3, or FIG. 4. The brush holder moves, shifts, so as to maintain the required operating brush spring loads between the brushes and the commutator segments. The control of reverse-directed torque at four torque levels will be described by referring to FIG. 1, FIG. 4, and FIG 5. The reverse torque generating sequence, the inverted sequence, starts with the brush holder 82 in the position shown in FIG. 4 and with all the electrical switches 1, 2, 3, 4, 5, 6, 7, and 8 open, as shown in FIG. 1.

Figure 4:
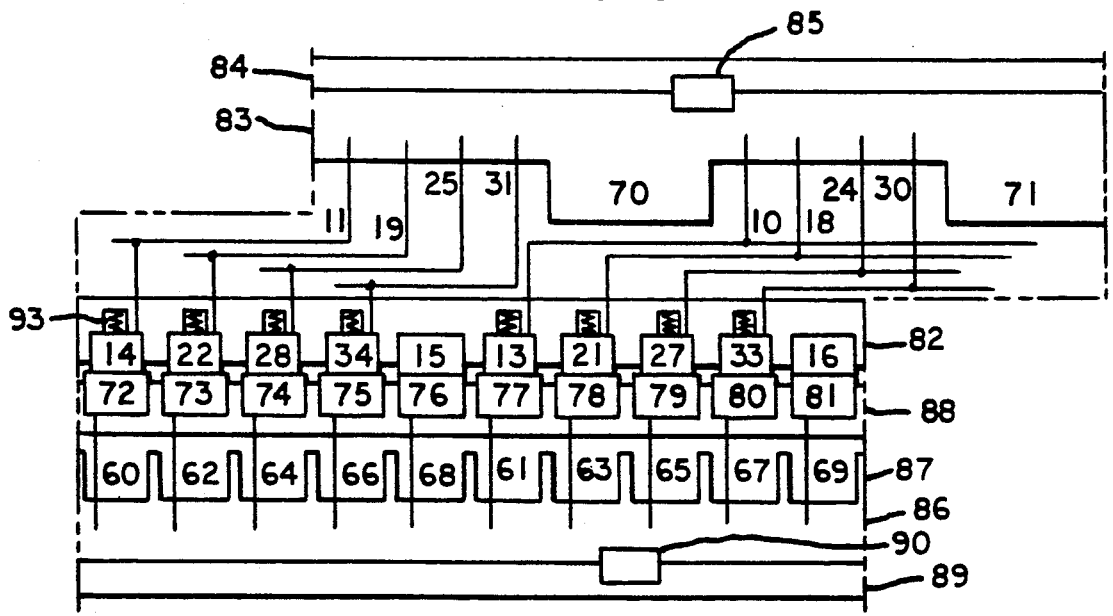
FIG. 4 is a representation of a portion of the multiple windings electrical motor of FIG. 1 showing the brush holder shifted with respect to the stator poles to cause force or torque generation in the reverse direction, or opposite direction from FIG. 1.

FIG. 1 with brush holder 82 positioned as in FIG. 4, the first step of the reverse sequence is to energize the stator windings 29-30 and 31-32 from the uni-directional voltage source 51 by closing electrical switches 7 and 8. The stator windings 29-30 and 31-32 connect to first and second brushes group brushes 33 and 34 respectively, which connect through various segments of the commutator 88 at various armature positions to energize two-node, open circuit armature windings once removed from the brush vacancies 15 and 16, and from which the armature and two-node, open circuit armature windings will move toward the brush vacancies in the reverse direction of torque generation—armature movement to the right in FIG. 4.

In FIG. 1 with brush holder 82 positioned as in FIG. 4, the second step in the reverse torque generating sequence is to continue the first step of this sequence and additionally energize the stator windings 23-24 and 25-26 from the source 51 by closing electrical switches 5 and 6. The stator windings 23-24 and 25-26 connect to first and second brushes groups brushes 27 and 28 respectively, which connect through various segments of the commutator 88 at various armature positions to energize two-node, open circuit armature windings twice removed from the brush vacancies contrary to the direction of torque generation.

In FIG. 1 with the brush holder 82 positioned as in FIG. 4, the third step of the reverse torque generating sequence is to continue the second step of this sequence and additionally energize the stator windings 17-18 and 19-20 from the source 51 by closing electrical switches 3 and 4. The stator windings 17-18 and 19-20 connect to first and second brushes groups brushes 21 and 22 respectively, which connect through various segments of the commutator 88 at various armature positions to energize two-node open circuit armature windings thrice removed from the brush vacancies contrary to the direct of torque generation.

In FIG. 1 with brush holder 82 positioned as in FIG. 4, the fourth step of the reverse torque generating sequence is to continue the third step of this sequence and additionally energize the stator windings 9-10 and 11-12 from the source 51 by closing electrical switches 1 and 2. The stator windings 9-10 and 11-12 connect to first and second brushes groups brushes 13 and 14 respectively, which connect through various segments of the commutator 88 at various armature positions to energize two-node, open circuit armature windings fourth removed from the brush vacancies contrary to the direction of torque generation.

In FIG. 1 with brush holder 82 positioned as in FIG. 4, the decrease in reverse torque generation level is the inverse, or backing-down the sequence, of the above sequence for increasing reverse torque generation level, or magnitude.

The direction of torque generation can be controlled in a multiple windings electrical motor by (1) a brush holder shift, as described above, wherein the brush holder is shifted by one or an odd number of stator pole pitches, or (2) by winding current reversal wherein currents through stator windings are reversed with respect to currents through armature windings. The preferred of these two methods of torque direction control for the multiple windings electrical motor is by shifting the brush holder by one, or an odd number, or stator pole pitches in the direction of commutator movement. The winding current reversal is more complex in requiring additional switchgear on a multiple windings electrical motor to effect the reversal. Shifting the brush holder requires bearings on the brush holder to maintain the brush holder relationship to the commutator and it requires flexible electrical connections to the brushes.

Figure 2:
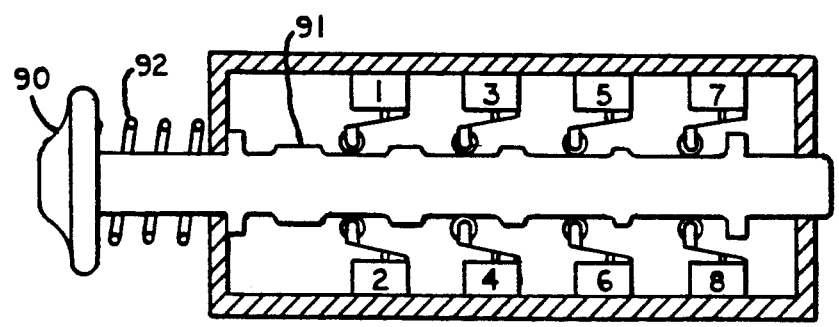
FIG. 2 shown a cam-operated controller for operating the four switches of FIG. 1 to provide force or torque control in a forward direction for the multiple windings electrical motor of FIG. 1.

FIG. 2 shows a push-knob operated cammed switch controller with a spring return for use in controlling the forward torque generated by a multiple windings electrical motor such as shown in FIG. 1. The controller is shown in the zero torque position with all the electrical switches open, and the cam 91 held to the left against its stop by the compression spring 92. When it is desired to increase the multiple windings electrical motor forward torque, the knob 90 is pressed, moving cam 91 to the right, and compressing spring 92. The cam 91 is designed so the electrical switches operate in the sequence: 1 and 2, 3 and 4, 5 and 6, and 7 and 8, and that previously closed switches will continue closed as new ones are operated. Thus, pressing the knob 90 slowly until it causes the cam 91 to hit the right stop and slowly releasing knob 90 causes the forward torque of the multiple windings electrical motor of FIG. 1 to increase to the maximum torque in four steps and to decrease to zero torque through the same four steps in reverse order. Also notice that the torque may be increased to a less-than-maximum level and decreased from that level.

Figure 5:
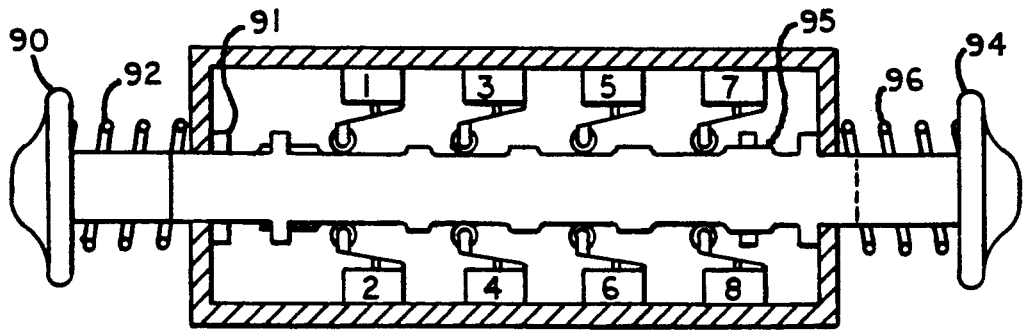
FIG. 5 shows a cam-operated controller for operating the switches of FIG. 1 to provide force or torque control in either the forward direction, represented by the brush holder position in FIG. 1, or the reverse direction, represented by the brush holder position of FIG. 4.

FIG. 5 shows a dual-cam switch controller operating one set of electrical switches with two cams 91 and 95 with separate push knobs to operate each cam and separate springs to return each cam; cam 1 is operated by knob 90 and returned by spring 92, and cam 95 is operated by knob 94 and returned by spring 96. The knob 90, cam 91, and spring 92 operate just as described for FIG. 2 to control forward torque levels, when the brush holder 82 is in the position shown in FIG. 1; the knob 94, cam 95, and spring 96 operate similarly to the knob 90, cam 91 and spring 92, but these control the reverse torque levels. Before the knob 94, cam 95, and spring 96 can be operated efficiently in the multiple windings electrical motor fashion, the brush holder 82 must be shifted to the FIG. 4 position. Once that has been done, pressing the knob 94 slowly to the cam 95 left stop and slowly releasing knob 94 causes the reverse torque of the multiple windings electrical motor of FIG. 4 to increase the maximum torque in four steps and to decrease to zero torque through the same four steps in reverse order. Operating the cam 95 in this manner causes the electrical switches to be operated in the inverted sequence described above for control of reverse torque.

Figure 6:
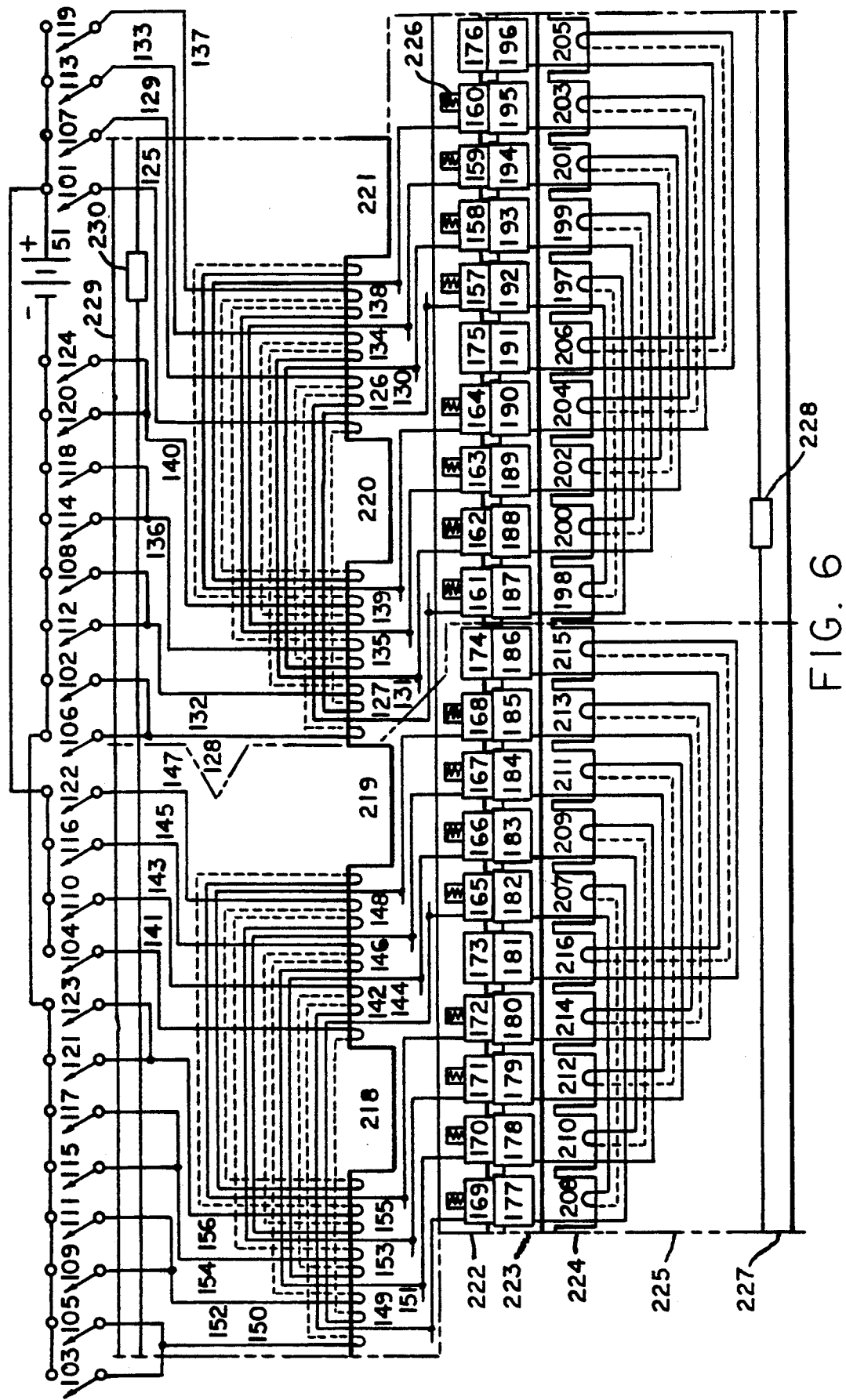
FIG. 6 shows a linear representation of a four-pole multiple windings electrical motor controller in which the multiple windings electrical motor has eight force or torque generating winding sets and the force or torque may be varied between zero and maximum in twelve discrete steps by operating various switches. Multiple-repeatable-section motor controllers of this type can obtain more control steps than the number of force or torque generating winding sets. This is because each two-node, open circuit armature winding, as relative movement occurs, is connected through respective commutator segments to two alternately-described groups of brushes; so, switches controlling electrical power source energizing to the alternately-described groups of brushes will control current flow through the force of torque generating winding set. The multiple windings electrical motor linear representation uses the same type of drawing simplifications used in the reference patent and FIG. 1, except therein the commutator is designated 223, the commutator segments are designated 177 through 196, the brush holder is designated 22, the brushes are designated 157 through 176, and one brush spring is designated 226.

Notice that the basic electrical switch required to switch each step of the torque varying sequence for the FIG. 1 multiple windings electrical motor with two stator poles, is a double-pole, single-throw (DPST) switch, such as switches 1 and 2 combined. The required basic electrical switch is different when the multiple windings electrical has two or more pairs of stator poles. In these cases the armature winding current flow circuits are completed half the time through adjacent repeatable sections, assuming a constant motor speed;

therefore, a third switch pole can be used for each step connected in parallel with another switch pole in an adjacent repeatable section to control energization of a second brushes group brush. In FIG. 6, third switch poles are shown parallel-connected between the negative terminal of source 51 and the winding ends 128, 132, 136, 140, 150, 152, 154, and 156. These third switch poles may be controlled as an additional pole on each two pole switch, making three pole switches, or the third poles may be controlled individually in proper relation to the other switches to provide an intermediate torque level between respective steps. A controller for the multiple windings electrical motor with two or more pairs of stator poles will be described in the following section.

The controllers for multiple windings electrical motors with two or more pairs of stator poles are described in the following by referring to FIG. 6. A multiple windings electrical motor with two stator poles does not have the generality of a multiple windings electrical motor with two or more pairs of stator poles when a controller is being described. To explain the more general multiple windings electrical motor controller, consider a multiple windings electrical motor consisting of two pair of stator poles with split-series stator windings as shown in FIG.. 6. The FIG. 6 shows a multiple pole windings electrical motor with two stator poles pairs with four stator windings per pole pair and five two-node, open circuit armature windings per pole pair. This combination is representative of multiple windings electrical motors with larger numbers of pairs of stator poles and with different numbers of stator windings and armature windings per pole pair. This FIG. 6 multiple windings electrical motor can be varied from zero torque to maximum torque in eight increments by closing eight three-pole single-throw electrical switches in sequence, or twelve increments if the switches are grouped for control as two-pole single-throw switches and as separate single-throw switches. These electrical switch poles are designated 101 through 124. These electrical switches switch both ends of the split-series stator windings. The reason for switching both ends of the split-series stator windings which connect to the unidirectional voltage source 51 is to allow electromagnetic energy recovery using diodes connected to the source 51 electrical terminals from the un-energized two-node-open-circuit-armature-windings-energizing first and second brushes groups brushes positions; since all the brush positions may be un-energized at some torque level in forward or reverse, this means that diodes are so connected to all the brush positions. This electromagnetic energy recovery occurs, as described above for a two-pole multiple windings electrical motor, when a commutator segment or bar leaves a first or second brushes group brush while the commutator segment is yet removed from the brush vacancies. These segments are designated 177 through 196 in FIG. 6. The negative-connected end of the split-series stator windings used in a two or more repeatable section multiple windings electrical motor is sometimes in the same repeatable section as the positive-connected end and sometimes in an adjacent repeatable section; see the referenced patents for a detailed description. A repeatable section is a one pole-pair machine, in FIG. 1, FIG. 3, FIG. 4, FIG. 6, FIG. 7, and FIG. 18, the double-dashed lines mark repeatable section boundaries; repeatable sections are joined at the stator structural support, stator magnetic yoke, mechanical energy coupling, magnetic armature, commutator, brush holder, and at the electrical terminals or electrical energy coupling means. To achieve electromagnetic energy recovery from the un-energized two-node-open-circuit-armature-winding-energizing first and second brushes groups brushes positions requires that a normally reverse-biased diode be connected, as described above for FIG. 1, from each brush to each uni-directional voltage source 51 terminal. These diodes are not shown in FIG. 6 to simplify and clarify the drawing; however, the diode-brush connection points are indicated as unterminated wires along the brush-to-winding connections.

In a three-pole-switch controller, the Fig. 6 torque-varying switches 101 through 124 are operated in groups of three by switch actuators, similar to those shown in FIG. 2 and FIG. 5, in eight steps to produce eight torque levels. Thus, the FIG. 6 multiple windings electrical motor torque can be varied in increments of about one eighth of the maximum torque by energizing or de-energizing the torque generating winding sets of this motor one at a time in an eighth-step sequence. FIG. 6 also shows: stator magnetic yoke 217, structural support 229, key 230, brush springs one designated 226, spring-loaded brushes 157 through 172, brush holder 222, magnetic armature 225 with teeth one of which is 224, commutator 223 with conducting segments 177 through 196, mechanical energy coupling 227, key 228, and brush vacancies 173 through 176. The brush holder 222 is mechanically attached to the structural support 229, and the commutator 223 is mechanically attached to the mechanical energy coupling 227.

In FIG. 6, the first step of the eight-step of the eight-step sequence is to energize the stator windings 125–126, 127–128, and 149–150 by closing electrical switches 101, 102, and 103. The stator winding 125–126 connects to first brushes group brush 157, and the stator windings 127–128 and 149–150 connect to second brushes group brushes 161 and 169 respectively; these brushes 157 with 161 or 157 with 169 connect through various segments of the commutator 223 at various armature positions to energize two-node, open circuit armature windings once removed from the brush vacancies 175 and 174 or 175 and 176 contrary to the direction of torque generation. In the FIG. 1, the torque generating set positions can be defined in relation to only two brush vacancies; however, in the more general multiple windings electrical motor of this FIG. 6, the torque generating set positions are defined in relation to three brush vacancies or two sets of brush vacancies; one brush vacancy is a central one and the other two are adjacent to the central one.

In FIG. 6, the second step of this eight-step sequence is to continue the first step and additionally energize the stator windings 141–142, 149–150, and 127–128 by closing electrical switches 104, 105, and 106. The stator winding 141–142 connects to first brushes group brush 165 and the stator windings 149–150 and 127–128 connect to second brushes group brushes 169 and 161 respectively; these brushes 165 with 169 or 165 with 161 connect through various segments of the commutator 223 at various armature positions to energize two-node, open circuit armature windings once removed from the brush vacancies 173 and 176 or 173 and 174 contrary to the direction of torque generation.

In FIG. 6, the third step of this sequence is to continue the second step and additionally energize the stator windings 129–130, 131–132, and 151–152 by closing electrical switches 107, 108, and 109. The stator winding 129-130 connects to first brushes group brush 158 and the stator windings 131-132 and 151-152 connects to second brushes group brushes 162 and 170 respectively; these brushes 158 with 162 or 158 with 170 connect through various segments of the commutator 223 at various armature positions to energize two-node, open circuit armature windings twice removed from the brush vacancies 175 and 174 or 175 and 176 contrary to the direction of torque generation.

In FIG. 6, the fourth step of this sequence is to continue the third step and additionally energize the stator windings 143-144, 151-152, and 131-132 by closing electrical switches 110, 112, and 111. The stator windings 143-144 connects to first brushes group brush 166, and the stator windings 151-152 and 131-132 connect to second brushes group brushes 170 and 162 respectively; these brushes 166 with 170 or 166 with 162 connect through various segments of the commutator 223 at various armature positions to energize two-node open circuit armature windings twice removed from the brush vacancies 173 and 176 or 173 and 174 contrary to the direction of torque generation.

In FIG. 6, the fifth step of this sequence is to continue the fourth step and additionally energize the stator windings 133-134, 135-136, and 153-154 by closing electrical switches 113, 114, and 115. The stator winding 133-134 connects to first brushes group brush 159, and the stator windings 135-136 and 153-154 connect to second brushes group brushes 163 and 171 respectively; these brushes 159 with 163 or 159 with 171 connect through various segments of the commutator 223 at various armature positions to energize two-node, open circuit armature windings thrice removed from the brush vacancies 175 and 174 or 175 and 176 contrary to the direction of torque generation.

In FIG. 6, the sixth step of this sequence is to continue the fifth step and additionally energize the stator windings 145-146, 153-154, and 135-136 by closing electrical switches 116, 117, and 118. The stator winding 145-146 connects to first brushes group brush 167, and the stator windings 153-154 and 135-136 connect to second brushes group brushes 171 and 163 respectively; these brushes 167 with 171 or 167 with 163 connect through various segments of the commutator 223 at various armature positions to energize two-node, open circuit armature windings thrice removed from the brush vacancies 173 and 176 or 173 and 174 contrary to the direction of torque generation.

In FIG. 6, the seventh step of this sequence is to continue the sixth step and additionally energizes the stator windings 137-138, 139-140, and 155-156 by closing electrical switches 119, 120, and 121. The stator winding 137-138 connects to first brushes group brush 160, and the stator windings 139-140 and 155-156 connect to second brushes group brushes 164 and 172 respectively; these brushes 160 with 164 or 160 with 172 connect through various segments of the commutator 223 at various armature positions to energize two-node, open circuit armature windings fourth removed from the brush vacancies 175 and 174 or 175 and 176 contrary to the direction of torque generation.

In FIG. 6, the eighth step of this sequence is to continue the seventh step and additionally energize the stator windings 147-148, 155-156, and 139-140 by closing electrical switches 122, 123, and 124. The stator winding 147-148 connects to first brushes group brush 168, and the stator windings 155-156 and 139-140 connect to second brushes group brushes 172 and 164 respectively; these brushes 168 with 172 or 168 with 164 connect through various segments of the commutator 223 at various armature positions to energize two-node, open circuit armature windings fourth removed from the brush vacancies 173 and 176 or 173 and 174 contrary to the direction of torque generation. This completes the eight-step energizing sequence for the three-pole-switch controller to cause the FIG. 6 multiple windings electrical motor to reach its maximum torque generating level.

The de-energizing sequence for the three-pole-switch controller to reach the zero torque level from the maximum torque level in the FIG. 6 motor is the reverse of the energizing sequence described above. The eight-step de-energizing sequence by step condition proceeds: eight, seven, six, five, four three, two, one and zero. Throughout all the above energizing and de-energizing steps, the multiple windings electrical motor configuration is retained at each energized step.

The control of reverse torque in the general multiple windings electrical motor as represented by the FIG .6 configured motor is done similarly to that control of reverse torque described for the FIG. 1 motor with the brush holder 82 shifted as in FIG. 4. The brush holder 222 is shifted by one, or an odd number of, stator pole pitches, and the electrical switches are operated in an inverted sequence to energize to maximum reverse torque generation. In the eight-step sequence of the three-pole-switch controller, the reverse-energizing sequence is as follow: step one: switches 124, 123, and 122; step two: switches 121, 120, and 119; step three: switches 118, 117, and 116; step four: switches 115, 114, and 113; step five: switches 112, 111, and 110; step six: switches 109, 108, and 107; step seven: switches 106, 105, and 104; step eight: switches 103, 102, and 101. To decrease to zero torque from the maximum reverse torque generation, just back-down the above eight-step sequence.

Again notice that the torque in either reverse or forward generating sequences may be increased or decreased from any intermediate torque level.

In a twelve-increment controller, the FIG. 6 torque-varying switches 101 through 124 are operated in groups of two followed by single switches actuations to energize brushes at each level-removed from brush vacancies contrary to the direction of force or torque generation. In FIG. 6 there are brushes four levels-removed, four brush positions removed, from brush vacancies contrary to the direction of force or torque generation.

In FIG. 6 the first step of a twelve-increment sequence from zero to maximum force or torque is to energize brushes 157 and 161 through stator windings 125-126 and 127-128, respectively, by closing switches 101 and 102. The brushes 157 and 161 are a first brushes group brush and a second brushes group brush, respectively, and these brushes are in one repeatable section. This type connection to two-node, open circuit armature windings was previously mentioned as a first alternately-described connection. These brushes 157 and 161 are once removed from brush vacancies 175 and 174, respectively contrary to the direction of force or torque generation, and connect through various segments of the commutator 223 at various armature positions to two-node, open circuit armature windings, and thus, will energize such windings.

In FIG. 6 the second step of the twelve-increment sequence is to continue the first step and energize second rushes group brush 169 through stator winding 149-150 by closing switch 103. This brush 169 is once removed from brush vacancy 176 contrary to the direction of force or torque generation, and this brush 169 is in a repeatable section adjacent to the first-step repeatable section. This type connection to two-node, open circuit armature windings was previously mentioned as a second alternately-described connection. The brush 169 with brush 157 connects through various segment of the commutator 223 at various armature positions to two-node, open circuit armature windings, and thus, will energize such windings.

In FIG. 6 the third step of the twelve-increment sequence is to continue the second step and energize first brushes group brush 165 through stator winding 141-142 by closing switch 104. This brush 165 is once removed from brush vacancy 173 contrary to the direction of force or torque generation. The brush 165 with brush 161 and with brush 169 connects through various segments of the commutator 223 at various armature positions to two-node, open circuit armature windings, and thus, will energize such windings. These type connections to two-node, open circuit armature windings were previously mentioned as a second alternately-described connection and as a first alternately-described connection, respectively.

In FIG. 6 the fourth step of the twelve-increment sequence is to continue the third step and energize brushes 158 and 162 through stator windings 129-130 and 131-132, respectively, by closing switches 107 and 108. The brushes 158 and 162 are a first brushes group brush and a second brushes group brush, respectively, and these brushes are in one repeatable section. This type connection to two-node, open circuit armature windings was previously mentioned as a first alternately-described connection. These brushes 158 and 162 are twice removed from brush vacancies 175 and 174, respectively, contrary to the direction of force or torque generation, and connect through various segments of the commutator 223 at various armature positions to two-node, open circuit armature windings, and thus, will energize such windings.

In FIG. 6 the fifth step of the twelve-increment sequence is to continue the fourth step and energize second brushes group brush 170 through stator winding 151-152 by closing switch 109. This brush 170 is twice removed from brush vacancy 176 contrary to the direction of force or torque generation, and this brush 170 is in a repeatable section adjacent to the fourth-step repeatable section. This type connection to two-node, open circuit armature windings was previously mentioned as a second alternately-described connection. The brush 170 with brush 158 connects through various segments of the commutator 223 at various armature positions to two-node, open circuit armature windings, and thus, will energize such windings.

In FIG. 6 the sixth step of the twelve-increment sequence is to continue the fifth step and energize first brushes group brush 166 through stator winding 143-144 by closing switch 110. This brush 166 is twice removed from brush vacancy 173 contrary to the direction of force or torque generation. The brush 166 with brush 162 and with brush 170 connects through various segments of the commutator 223 at various armature positions to two-node, open circuit armature windings, and thus, will energize such windings. These type connections to two-node, open circuit armature windings were previously mentioned as a second alternately-described connection and as a first alternately-described connection, respectively.

In FIG. 6 the seventh step of the twelve-increment sequence is to continue the sixth step and energize brushes 159 and 163 through stator windings 133-134 and 135-136, respectively, by closing switches 113 and 114. The brushes 159 and 163 are a first brushes group brush and a second brushes group brush, respectively, and these brushes are in one repeatable section. This type connection to two-node, open circuit armature windings was previously mentioned as a first alternately-described connection. These brushes 159 and 163 are thrice removed from brush vacancies 175 and 174, respectively, contrary to the direction of force or torque generation, and connect through various segments of the commutator 223 at various armature positions to two-node, open circuit armature windings, and thus, will energize such windings.

In FIG. 6 the eighth step of the twelve-increment sequence is to continue the seventh step and energize second brushes group brush 171 through stator winding 153-154 by closing switch 115. This brush 171 is thrice removed from brush vacancy 176 contrary to the direction of force or torque generation, and this brush 171 is in a repeatable section adjacent to the seventh-step repeatable section. This type connection to two-node, open circuit armature windings was previously mentioned as a second alternately-described connection. The brush 171 with brush 159 connects through various segments of the commutator 223 at various armature positions to two-node, open circuit armature windings, and thus, will energize such windings.

In FIG. 6 the ninth step of the twelve-increment sequence is to continue the eighth step and energize first brushes group brush 167 through stator winding 145-146 by closing switch 116. This brush 167 is thrice removed from brush vacancy 173 contrary to the direction of force or torque generation. The brush 167 with brush 163 and with brush 171 connects through various segments of the commutator 223 at various armature positions to two-node, open circuit armature windings, and thus, will energize such windings. These type connections to two-node, open circuit armature windings were previously mentioned as a second alternately-described connection and as a first alternately-described connection, respectively.

In FIG. 6 the tenth step of the twelve-increment sequence is to continue the ninth step and energize brushes 160 and 164 through stator windings 137-138 and 139-140, respectively, by closing switches 119 and 120. The brushes 160 and 164 are a first brushes group brush and a second brushes group brush, respectively, and these brushes are in one repeatable section. This type connection to two-node, open circuit armature windings was previously mentioned as a first alternately-described connection. These brushes 160 and 164 are fourth removed from brush vacancies 175 and 174, respectively, contrary to the direction of force or torque generation, and connect through various segments of the commutator 223 at various armature positions to two-node, open circuit armature windings, and thus, will energize such windings.

In FIG. 6 the eleventh step of the twelve-increment sequence is to continue the tenth step and energize second brushes group brush 172 through stator winding 155-156 by closing switch 121. This brush 172 is fourth removed from brush vacancy 176 contrary to the direction of force or torque generation, and this brush 172 is in a repeatable section adjacent to the tenth-step repeatable section. This type connection to two-node, open circuit armature windings was previously mentioned as a second alternately-described connection. The brush 172 with brush 160 connects through various segments of the commutator 223 at various armature positions to two-node, open circuit armature windings, and thus, will energize such windings.

In FIG. 6 the twelfth step of the twelve-increment sequence is to continue the eleventh step and energize the arma-first brushes group brush 168 through stator winding 147-148 by closing switch 122. This brush 168 is fourth removed from brush vacancy 173 contrary to the direction of force or torque generation. The brush 168 with brush 164 and with brush 172 connects through various segments of the commutator 223 at various armature positions to two-node, open circuit armature windings, and thus, will energize such windings. These type connections to two-node, open circuit armature windings were previously mentioned as a second alternately-described connection and as a first alternately-described connection, respectively.

The de-energizing sequence for the twelve-increment controller in the FIG. 6 motor-controller is the reverse of the energizing sequence described above. The twelve-step de-energizing sequence by step condition proceeds: twelfth, eleventh, tenth, ninth, eighth, seventh, sixth, fifth, fourth, third, second, first, and zero.

COOPERATIVE MOTOR CONTROLLERS

The FIG. 16 represents a general motor torque controller which cooperatively controls motor torque using two or more control means.

The control of a single-repeatable-section multiple windings electrical motor using brush holder positioning and other assorted control elements will be described by referring to the single-repeatable-section motor and controller of FIG. 7 and the control elements shown in FIG. 10, FIG. 11, FIG. 12, FIG. 13, FIG. 14, and FIG. 15. The multiple windings electrical motor of FIG. 7 has permanent-magnet energized, stator magnetic poles 241 and 242, and three, two-node, open circuit armature windings: 264-267, 265-268, and 266-269. The FIG. 7 also shows: stator magnetic yoke 276, structural support 277, key 278, brush spring 251, spring-loaded groups brushes 245 and 246, brush holder 271, magnetic armature 272 with teeth one of which is 273, commutator 261 with conducting elements 255 through 260, mechanical energy coupling 274, key 275, brush vacancy brushes 247 through 250, and brush holder positioning arm 270. The control element of FIG. 7 is the brush holder positioning arm 270, by which the brush holder 271 is moved to the right or to the left, thereby varying the orientation between armature electromagnetic poles and the stator magnetic poles, to control the magnitude and direction of torque generated by the FIG. 7 motor.

The controller of FIG. 7 may be expanded to include current control for the armature windings by connecting electrical switches, such as the switch poles 288 and 289 of FIG. 14, to the FIG. 7 terminals 235 and 236. This current control would become significant if the motor of FIG. 7 is configured into a multiple-repeatable-section motor; then, multiples of the FIG. 14 two-pole switches plus additions of the FIG. 15 single-pole switches 291 added as taught in connection with the FIG. 6 controller would provide multiple control levels. Also, the various types of energy recovery and disposal taught earlier for brush vacancies may be practiced by connecting selected ones of the elements shown in FIG. 10, FIG. 11, FIG. 12, and FIG. 13 to terminals 237 through 240.

One cooperative controller for a multiple windings electrical motor combines the control of current control switches and the brush holder position to maintain a near-optimum motor torque generation at all levels of torque. The resultant position of electromagnetic poles on the armature will change with respect to the armature as various numbers of armature windings are energized. The orientation of armature electromagnetic poles with respect to the stator magnetic poles can be adjusted by positioning the brush holder; so, positioning the brush holder can also adjust the armature poles to be near-optimum for each number of armature windings energized. The FIG. 17 shows a cooperative controller in which electric motor control is achieved by moving the handle 301, pivoted around pin 323, to the right to increase torque, and allowing the handle 301 to be returned to the left by spring 321 to decrease torque. The handle 301 is coupled to brush holder positioning cam 302 through linkage 303, and also coupled to current control means 304 through linkage 305. The current control means 304 includes switches and a switch actuating cam 306 for the FIG. 6 switches 101 through 124, not shown in FIG. 17 for simplicity, and the current control means 304 is constructed following the teaching of FIG. 2. The cam 302 is coupled to the brush holder 222 of FIG. 6 through a cam surfaces 311, a roller 312 mounted on bar 313, and linkage 314. The bar 313 is guided by a path in member 310. The cooperative control is achieved by adjusting the position of handle 301 against spring 321 and away from stop 322, as the handle 301 pivots around pin 323 on support 320. The movement of the handle 301 causes movement of the cam 302 and the cam 306 of different amounts according to the differeing leverages due to the different attachment points of linkages 303 and 305 of handle 301. In this manner, a given handle 301 position provides closure of a number of the current control switches 101 to 124 following the earlier teaching and also provides a brush holder 222 position. The support 315 and particularly the cam 302 are closely coupled to the structural support 229 of FIG. 6 for controlling the position of brush holder 222.

The controller shown in FIG. 18 provides single-step current control on a single-repeatable-section, series-configured, multiple windings electrical motor by switches 379 and 380, which are in series with each portion of a split stator winding 360-361 and 362-363. This controller may be energized either from an AC or DC source, such as shown in FIG. 8 or FIG. 9, respectively. This controller provides control of the orientation of the armature electromagnetic poles with respect to the stator magnetic poles 366 and 367 by controlling the position of brush holder 340 using positioning lever 392. The armature. electromagnetic poles are established by current flow through connected two-node, open circuit armature windings.

In FIG. 18, energy recovery and disposal from the group brushes 346 and 347 is provided by closing the switches 383 and 384 to connect two half bridge circuits composed of diodes 385 through 388. The elements to be connected at electrical energy coupling terminals 390 and 391 may be one of the following; a DC electrical energy source or storage device with the negative to terminal 390 and the positive to terminal 391, or an electrical energy dissipating device or devices such as a resistor, a varistor, a zener diode, or back-to-back zener diodes.

Dynamic braking can be achieved by switching to control energy disposal or energy recovery from un-energized, two-node, open circuit armature windings. In the controller of FIG. 18, dynamic braking control is provided when the current control switches 379 and 380 are open by operating the switches 383 and 384. These switch combinations are equivalent to controlling the commutator contact of the group brushes by lifting these brushes within the brush holder.

In FIG. 18, energy recovery and disposal from brush vacancy brushes 356 through 359 is shown by the connection to four half bridge circuits composed of diodes 369 through 376, which deliver polarized, recovered electrical energy to electrical energy coupling terminals 377 and 378, positive to terminal 378 and negative to terminal 377.

I claim as my invention;

1. A controller for an electric motor comprising:
   a motor including a stator and an armature and the stator including stator magnetic poles and the armature including multiple two-node, open circuit armature windings inductively linkage the armature and insulated from the armature and from each other;
   the motor having at least one repeatable section, wherein a repeatable section includes a group of poles and windings;
   the stator having two stator magnetic poles per repeatable section;
   magnetomotive force means energizing the stator magnetic poles as a north pole and a south pole per repeatable section, and with adjacent poles being of opposite polarity; and
   means to control electrical currents in from none to at least one two-node, open circuit armature winding thereby forming armature electromagnetic poles of various numbers to the strength levels available, with adjacent armature electromagnetic poles having opposite polarity, and with no more than two armature electromagnetic poles per repeatable section, to control the force and torque generated by the motor.

2. A controller as in claim 1 wherein the means to control includes a means for sequences of:
   electrical connections to the nodes of the two-node, open circuit armature windings from electrical power sources;
   and in multiple-repeatable-sections motors;
   the electrical connections to repeatable sections in groups of repeatable sections capable of generating force and torque in dynamic balance; and
   the electrical connections to the nodes of the two-node, open circuit armature windings having one node in one repeatable section and the respective mating node in an adjacent repeatable section.

3. A controller as in claim 1 wherein the magnetomotive force means comprises at least one stator winding inductively linkage at least one stator magnetic pole; and
   the means to control electrical currents includes means to control electrical currents in from none to at least one stator winding.

4. A controller as in claim 3 wherein the means to control includes a means for sequence of:
   electrical connections to the nodes of the two-node, open circuit armature windings from electrical power sources;
   electrical connections to the nodes of the at least one stator winding; and in multiple-repeatable-sections motors;
   the electrical connections to repeatable sections in groups of repeatable sections capable of generating force and torque in dynamic balance; and
   the electrical connections to the nodes of the two-node, open circuit armature windings having one node in one repeatable section and the respective mating node in an adjacent repeatable section.

5. A controller for an electric motor comprising:
   a motor including a stator and an armature and the stator including stator magnetic poles and the armature including multiple two-node, open circuit armature windings inductively linkage the armature and insulated from the armature and from each other;
   the motor having at least one repeatable section, wherein a repeatable section includes a group of poles and windings;
   the stator having two stator magnetic poles per repeatable section and the stator magnetic poles being separated by separations designated within each repeatable section as first separation and second separation, and said separations being placed alternately first and second in the direction of relative movement between the stator and the armature;
   magnetomotive force means energizing the stator magnetic poles as a north pole and a south pole per repeatable section, and with adjacent poles being of opposite polarity;
   means forming two armature electromagnetic poles per repeatable section, and with adjacent armature electromagnetic poles having opposite polarity; and
   means to control the relative orientation of the armature electromagnetic poles with respect to the stator magnetic poles by as much as one stator magnetic pole pitch to control the direction and magnitude of motor force and torque as follows:
   the direction being forward when a north-polarity armature electromagnetic pole adjacent to the first separation moves to approach a south-polarity stator magnetic pole,
   the direction being reverse when a north-polarity armature electromagnetic pole adjacent to the second separation moves to approach a south-polarity stator magnetic pole, and
   the magnitude of motor force and torque being controlled between a maximum obtained when the armature electromagnetic poles are equidistant between the stator magnetic poles and a minimum obtained when the armature electromagnetic poles are closest to the stator magnetic poles.

6. A controller as in claim 5 wherein the magnetomotive force means comprises at least one stator winding inductively linking at least one stator magnetic pole per repeatable section.

7. A controller for an electric motor comprising:
   a motor including a stator and an armature and the stator including stator magnetic poles and the armature including multiple two-node, open circuit armature windings inductively linkage the armature and insulated from the armature and from each other;

the motor having at least one repeatable section, wherein a repeatable section includes a group of poles and windings;

the stator having two stator magnetic poles per repeatable section and the stator magnetic poles being separated by separations designated within each repeatable section as first separation and second separation, and said separation being placed alternately first and second in the direction of relative movement between the stator and the armature;

magnetomotive force means energizing the stator magnetic poles as a north pole and a south pole per repeatable section, and with adjacent poles being a opposite polarity;

means to control electrical currents in form none to at least one two-node, open circuit armature winding thereby forming armature electromagnetic poles of various numbers to the strength levels available, with adjacent armature electromagnetic poles having opposite polarity, and with no more than two armature electromagnetic poles per repeatable section;

means to orient the armature electromagnetic poles with respect to the stator magnetic poles by as much as one stator magnetic pole pitch to control the direction and magnitude of motor force and torque as follows:

the direction being forward when a north-polarity armature electromagnetic pole adjacent to the first separation moves to approach a south-polarity stator magnetic pole, the direction being reverse when a north-polarity armature electromagnetic pole adjacent to the second separation moves to approach a south-polarity stator magnetic pole, and the magnitude of motor force and torque being controlled between a maximum obtained when the armature electromagnetic poles are equidistant between the stator magnetic poles and a minimum obtained when the armature electromagnetic poles are closest to the stator magnetic poles; and means to cooperatively control the means to control electrical currents and the means to orient, to control the magnitude and direction of motor force and torque.

8. A controller as in claim 7 wherein the means to cooperatively control includes a means for sequences of:

electrical connections to the nodes of the two-nodes, open circuit armature windings from electrical power sources;

the orientation of the armature electromagnetic poles with respect to the stator magnetic poles; and in multiple-repeatable-sections motors;

the electrical connections to repeatable sections in groups of repeatable sections capable of generating force and torque in dynamic balance; and the electrical connections to the nodes of the two-node, open circuit armature windings having one node in one repeatable section and the respective mating node in an adjacent repeatable section.

9. A controller as in claim 7 wherein the magnetomotive force means comprises at least one stator winding inductively linkage at least one stator magnetic pole per repeatable section; and the means to control electrical currents includes means to control electrical currents in from none to at least one stator winding.

10. A controller as in claim 9 wherein the means to cooperatively control includes a means for sequence of:

electrical connections to the nodes of the two-node, open circuit armature windings from electrical power sources:

electrical connections to the nodes of the at least one stator winding;

the orientation of the armature electromagnetic poles with respect to the stator magnetic poles; and in multiple-repeatable-sections motors;

the electrical connections to repeatable sections in groups of repeatable sections capable of generating force and torque in dynamic balance; and the electrical connections to the nodes of the two-node, open circuit armature windings having one node in one repeatable section and the respective mating node in an adjacent repeatable section.

11. A controller for an electric motor comprising:

a motor including a stator and an armature and the stator including stator magnetic poles and the armature including multiple two-node, open circuit armature windings inductively linking the armature and insulated from the armature and from each other;

the motor having at least one repeatable section, wherein a repeatable section includes a group of poles and windings;

the stator having two stator magnetic poles per repeatable section;

magnetomotive force means energizing the stator magnetic poles as a north pole and a south pole per repeatable section, and with adjacent poles being of opposite polarity;

means to control electrical currents in from none to at least one two-node, open circuit armature winding thereby forming armature electromagnetic poles of various numbers to the strength levels available, with adjacent armature electromagnetic poles having opposite polarity, and with no more two armature electromagnetic poles per repeatable section;

means to recover electromagnetic energy format least one un-energized, two-node, open circuit armature winding as electrical energy; and a second means to control the means to control electrical currents and the means to recover electromagnetic energy, to control the force and torque generated by the motor.

12. A controller as in claim 11 wherein the second means to control includes a means for sequences of:

electrical connections to the nodes of the two-node, open circuit armature windings from:
electrical power sources;
electrical energy dissipating devices;
each other;

and in multiple-repeatable-sections motors;

the electrical connections to repeatable sections in groups of repeatable sections capable of generating force and torque in dynamic balance; and the electrical connections to the nodes of the two-node, open circuit armature windings having one node in one repeatable section and the respective mating node in an adjacent repeatable section.

13. A controller as in claim 11 wherein the magnetomotive force means comprises at least one stator winding inductively linkage at least one stator magnetic pole.

14. A controller for an electric motor comprising:
- a motor including a stator and an armature and the stator including stator magnetic poles and the armature including multiple two-node, open circuit armature windings inductively linkage the armature and insulated from the armature and from each other;
- the motor having at least one repeatable section, wherein a repeatable section includes a group of poles and windings;
- the stator having two stator magnetic poles per repeatable section and the stator magnetic poles being separated by separations designated within each repeatable section as first separation and second separation, and said separations being placed alternately first and second in the direction of relative movement between the stator and the armature;
- magnetomotive force means energizing the stator magnetic poles as a north pole and a south pole per repeatable section, and with adjacent poles being of opposite polarity;
- means forming two armature electromagnetic poles per repeatable section, and with adjacent armature electromagnetic poles having opposite polarity;
- means to recover electromagnetic energy from at least one un-energized, two-node, open circuit armature winding as electrical energy; and
- means to control the means to recover electromagnetic energy and means to control relative orientation of the armature electromagnetic poles with respect to the stator magnetic poles by as much as one stator magnetic pole pitch to control the direction and magnitude of motor force and torque as follows:
- the direction being forward when a north-polarity armature electromagnetic pole adjacent to the first separation moves to approach a south-polarity stator magnetic pole,
- the direction being reverse when a north-polarity armature electromagnetic pole adjacent to the second separation moves to approach a south-polarity stator magnetic pole, and
- the magnitude of motor force and torque being controlled between a maximum obtained when the armature electromagnetic poles are equidistant between the stator magnetic poles and a minimum obtained when the armature electromagnetic poles are closest to the stator magnetic poles.

15. A controller as in claim 14 wherein the magnetomotive force means comprises at least one stator winding inductively linkage at least one stator magnetic pole per repeatable section.

16. A controller for an electric motor comprising:
- a motor including a stator and an armature and the stator including stator magnetic poles and the armature including multiple two-node, open circuit armature windings inductively linking the armature and insulated from the armature and from each other;
- the motor having at least one repeatable section, wherein a repeatable section includes a group of poles and windings;
- the stator having two stator magnetic poles per repeatable section and the stator magnetic poles being separated by separations designated within each repeatable section as first separation and second separation, and said separations being placed alternately first and second in the direction of relative movement between the stator and the armature;
- magnetomotive force means energizing the stator magnetic poles as a north pole and a south pole per repeatable section, and with adjacent poles being of opposite polarity;
- means to control electrical currents in from none to at least one two-node, open circuit armature winding thereby forming armature electromagnetic poles of various numbers to the strength levels available, with adjacent armature electromagnetic poles having opposite polarity, and with no more than two armature electromagnetic poles per repeatable section;
- means to recover electromagnetic energy from at least one un-energized, two-node, open circuit armature winding as electrical energy;
- means to control the relative orientation of the armature electromagnetic poles with respect to the stator magnetic poles by as much as one stator magnetic pole pitch to control the direction and magnitude of motor force and torque as follows:
- the direction being forward when a north-polarity armature electromagnetic pole adjacent to the first separation moves to approach a south-polarity stator magnetic pole,
- the direction being reverse when a north-polarity armature electromagnetic pole adjacent to the second separation moves to approach a south-polarity stator magnetic pole, and
- the magnitude of motor force and torque being controlled between a maximum obtained when the armature electromagnetic poles are equidistant between the stator magnetic poles and a minimum obtained when the armature electromagnetic poles are closest to the stator magnetic poles;
- said orientation being maintained at a controlled value as the relative movement occurs by the means to control electrical currents, shifting the armature electromagnetic poles on the armature by flowing current to at least one unenergized, two-node, open circuit armature winding and by interrupting current to at least one previously energized, two-node, open circuit armature winding; and
- means to cooperatively control the means to control electrical currents, the means to recover electromagnetic energy, and the means to control the relative orientation, to control the force and torque generated by the motor.

17. A controller as in claim 16 wherein the means to cooperatively control includes a means for sequences of:
- electrical connections to the nodes of the two-node, open circuit armature windings from:
  - electrical power sources;
  - electrical energy dissipating devices;
  - each other;
- the orientation of the armature electromagnetic poles with respect to the stator magnetic poles; and in multiple-repeatable-sections motors:
- the electrical connections to repeatable sections in groups of repeatable sections capable of generating force and torque in dynamic balance; and
- the electrical connections to the nodes of the two-node, open circuit armature windings having one node in one repeatable section and the respective mating node in an adjacent repeatable section.

18. A controller as in claim 16 wherein the magnetomotive force means comprises at least one stator winding inductively linking at least one stator magnetic pole per repeatable section; and the means to control electrical currents includes means to control electrical currents in from non to at least one stator winding.

19. A controller as in claim 18 wherein the means to cooperatively control includes a means for sequences of:

electrical connections to the nodes of the two-node, open circuit armature windings from:
electrical power sources;
electrical energy dissipating devices;
each other;

electrical connections to the respective nodes of the at least one stator winding;

the orientation of the armature electromagnetic poles with respect to the stator magnetic poles; and in multiple-repeatable-sections motors:

the electrical connections to repeatable sections in groups of repeatable sections capable of generating force and torque in dynamic balance; and the electrical connections to the nodes of the two-node, open circuit armature windings having one node in one repeatable section and the respective mating node in an adjacent repeatable section.

* * * * *

UNITED STATES PATENT AND TRADEMARK OFFICE
CERTIFICATE OF CORRECTION

PATENT NO. : 5,293,518

DATED : March 8, 1994

INVENTOR(S) : John T. R. Wilson

It is certified that error appears in the above-identified patent and that said Letters Patent is hereby corrected as shown below:

Abstract line 5 shall be corrected as follows: for "linked the" --linked to the--.
Column 6 lines shall be corrected as follows:
  line 53, for "therein" --herein--;
  line 56, for "22" --222--.
Column 11 line 9 shall be corrected as follows: for "FIG. 1" ---In FIG. 1,--.
Column 12 lines shall be corrected as follows:
  line 38, for "1" --91--;
  line 53, for the words "increase the" --increase to the--.
Column 13 lines shall be corrected as follows:
  line 27, for "poles" --pole--;
  line 64, for the comma punctuation mark "," --;--.
Column 14 lines shall be corrected as follows:
  line 8, for "uni-directional" --unidirectional--;
  line 21, for "eighth-step" --eight-step--.
Column 16 lines shall be corrected as follows:
  line 30, for "follow" --follows--;
  line 62, for "respectively" --respectively,--.
Column 17 lines shall be corrected as follows:
  line 1, for "rushes" --brushes--;
  line 9, for "segment" --segments--.
Column 19 line 48 shall be corrected as follows: for "elements" --segments--.
Column 20 lines shall be corrected as follows:
  line 38, for "differeing" --differing--;
  line 66, for the semicolon punctuation mark ";" --:--.
Column 21 lines shall be corrected as follows:
  line 25, which is in claim 1, for "linkage" --linking--;
  line 52, which is in claim 2, for the semicolon punctuation mark ";" --:--;
  line 62, which is in claim 3, for "linkage" --linking;
  line 68, which is in claim 4, for "sequence" --sequences--.

UNITED STATES PATENT AND TRADEMARK OFFICE
CERTIFICATE OF CORRECTION

PATENT NO. : 5,293,518

DATED : March 8, 1994

INVENTOR(S) : John T. R. Wilson

It is certified that error appears in the above-identified patent and that said Letters Patent is hereby corrected as shown below:

Column 22 lines shall be corrected as follows:
 line 6, which is in claim 4, for the semicolon punctuation mark ";" --:--;
 line 18, which is in claim 5, for "linkage" --linking--;
 line 68, which is in claim 7, for "linkage" --linking--.
Column 23 lines shall be corrected as follows:
 line 10, which is in claim 7, for the words "said separation" --said separations--;
 line 16, which is in claim 7, for the word "a" --of--;
 line 18, which is in claim 7, for "form" --from--;
 line 52, which is in claim 8, for "two-nodes" --two-node--;
 line 57, which is in claim 8, for the semicolon punctuation mark ";" --:--;
 line 67, which is in claim 9, for "linkage" --linking--.
Column 24 lines shall be corrected as follows:
 line 5, which is in claim 10, for "sequence" --sequences--;
 line 8, which is in claim 10, for the colon punctuation mark ":" --;--;
 line 13, which is in claim 10, for the semicolon punctuation mark ";" --:--;
 line 42, which is in claim 11, for the words "more two" --more than two--;
 line 44, which is in claim 11, for "format" --from at--;
 line 58, which is in claim 12, for the semicolon punctuation mark ";" --:--;
 line 68, which is in claim 13, for "linkage" --linking--.
Column 25 lines shall be corrected as follows:
 line 5, which is in claim 14, for "linkage" --linking--;
 line 52, which is in claim 15, for "linkage" --linking--.
Column 26 line 22, which is in claim 16, shall be corrected as follows: for "magne-" --magni--.

UNITED STATES PATENT AND TRADEMARK OFFICE
CERTIFICATE OF CORRECTION

PATENT NO. : 5,293,518
DATED : March 8, 1994
INVENTOR(S) : John T.R. Wilson

It is certified that error appears in the above-indentified patent and that said Letters Patent is hereby corrected as shown below:

Column 27, line 8, "non" should read --none--.

Signed and Sealed this

Thirteenth Day of December, 1994

Attest:

BRUCE LEHMAN

*Attesting Officer*  *Commissioner of Patents and Trademarks*